(12) United States Patent
Shagin

(10) Patent No.: US 8,387,023 B2
(45) Date of Patent: Feb. 26, 2013

(54) INSTRUMENTATION OF COMPUTER-BASED APPLICATION SOFTWARE

(75) Inventor: Konstantin Shagin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1166 days.

(21) Appl. No.: 12/252,396

(22) Filed: Oct. 16, 2008

(65) Prior Publication Data

US 2010/0100873 A1     Apr. 22, 2010

(51) Int. Cl.
  *G06F 9/44* (2006.01)
(52) U.S. Cl. .......................................... 717/130
(58) Field of Classification Search ............... 717/130
  See application file for complete search history.

(56) References Cited

U.S. PATENT DOCUMENTS

| | | | |
|---|---|---|---|
| 6,072,953 A | 6/2000 | Cohen et al. | |
| 7,093,242 B2 | 8/2006 | Bernadat et al. | |
| 7,275,239 B2 | 9/2007 | Cuomo et al. | |
| 7,281,242 B2 | 10/2007 | Inamdar | |
| 2005/0039187 A1 | 2/2005 | Avakian et al. | |
| 2005/0149915 A1* | 7/2005 | Wu et al. | 717/137 |
| 2008/0276227 A1* | 11/2008 | Greifeneder | 717/130 |

FOREIGN PATENT DOCUMENTS

| | | |
|---|---|---|
| EP | 1011043 | 2/2008 |
| WO | WO2008067357 | 6/2008 |

OTHER PUBLICATIONS

Liang, Sheng; The Java Native Interface: Programmers Guide and Specification; Jun. 1999, pp. 3-9.*
Factor et al., Conference Paper, "Instrumentation of standard libraries in object-oriented language: the twin class hierarchy approach", OOPSLA '04 Proceedings of the 19th annual ACM SIGPLAN conference on Object-oriented programming, systems, languages, and applications, 2004.

* cited by examiner

*Primary Examiner* — Li B Zhen
*Assistant Examiner* — Bradford Wheaton
(74) *Attorney, Agent, or Firm* — Dan Swirsky; AlphaPatent Associated Ltd.

(57) ABSTRACT

A method for instrumenting a computer-based software application, the method including instrumenting instructions of a computer-based software application, the instructions being in a first computer instruction language, with a native handler referencing instructions in a second language, and creating the instructions referenced by the native handler in the second computer instruction language to carry out at least one task during the execution of the computer-based software application.

12 Claims, 5 Drawing Sheets

```
class A {
    void foo(int p1, long p2){
        System.out.println("foo"); // instrumentation
        /* foo code begins here */
        ...
    }
}
```

Fig. 1A

```
class A {
    void foo(int p1, long p2){
        NativeHandler.myNativeHandler("foo"); // instrumentation
        /* foo code begins here */
        ...
    }
}
```

Fig. 1B

```
class NativeHandlers{
    public static native void myNativeHandler(String info);
}
```

Fig. 1C

```
JNIEXPORT void JNICALL Java_NativeHandlers_myHandler (JNIEnv *env, jclass cls, jstring str){ static jmethodID mid;
    jclass javaHandlerCls;

// get the Java handlers class
    javaHandlerCls = (*env)->FindClass(env,"JavaHandlers");
    // get a reference to the java handler method
    mid = (*env)->GetStaticMethodID(env, hcls, "myJavaHandler", "(Ljava/lang/String;)V");
        // call the java handler
    (*env)->CallStaticVoidMethod(env, javaHandlerCls, mid,str);

```
class JavaHandlers {
    public static void myJavaHandler(String info){
        System.out.println("foo");
    }
}
```

Fig. 1E

```
class A { void foo(int p1, long p2){
        JavaHandler.myJavaHandler("foo"); // instrumentation
        /* foo code begins here */
        ...
    }
}
```

Fig. 1F

INSTRUMENTATION OF COMPUTER-BASED APPLICATION SOFTWARE

FIELD OF THE INVENTION

The present invention relates to computer-based application software design, and more particularly to instrumentation of computer-based application software.

BACKGROUND OF THE INVENTION

Computer-based software applications are often monitored during execution to identify undesirable performance characteristics such as bottlenecks and infinite loops. For example, a software application developed in accordance with the Java™ 2 Platform, Enterprise Edition, may be "instrumented" with software probes in one or more locations throughout source code and/or bytecode, including in classes such as system classes, to allow performance monitors to gather such information during its execution. Unfortunately, instrumentation can sometimes interfere with an application or its operating environment, such as where instrumentation of Java™ Virtual Machine (JVM) system classes changes the order in which the system classes are normally loaded, resulting in JVM failure. Thus, for example, whereas the java.util.HashMap system class is normally loaded after the java.lang.String system class, if instrumentation code inserted into java.lang.String directly or indirectly references java.util.HashMap, the JVM will attempt to load java.util.HashMap first, causing the JVM to crash in many situations depending on the JVM implementation. It would therefore be advantageous if computer-based Java™ application software could be instrumented without causing changes in class loading order that would lead to such failures.

SUMMARY OF THE INVENTION

The present invention in embodiments thereof discloses novel systems and methods for instrumentation of computer-based application software.

In one aspect of the present invention a method is provided for instrumenting a computer-based software application, the method including instrumenting instructions of a computer-based software application, the instructions being in a first computer instruction language, with a native handler referencing instructions in a second language, and creating the instructions referenced by the native handler in the second computer instruction language to carry out at least one task during the execution of the computer-based software application.

In another aspect of the present invention the instrumenting step includes instrumenting Java™ source code.

In another aspect of the present invention the instrumenting step includes instrumenting Java™ bytecode.

In another aspect of the present invention the creating step includes creating where the instructions referenced by the native handler carry out the task.

In another aspect of the present invention the creating step includes creating where the instructions referenced by the native handler reference a class including instructions implemented in the first language that carry out the task.

In another aspect of the present invention the instrumenting step includes instrumenting a system class, and the instrumenting and creating steps are performed if the task would change the system class loading order of a virtual machine were the task included in instrumentation of the system class.

In another aspect of the present invention a system is provided for instrumenting a computer-based software application, the system including instrumentation apparatus configured to instrument instructions of a computer-based software application, the instructions being in a first computer instruction language, with a native handler referencing instructions in a second language, and at least one instruction referenced by the native handler in the second computer instruction language to carry out at least one task during the execution of the computer-based software application, where any of the apparatus and instructions are implemented in any of computer hardware and computer software embodied in a computer-readable medium.

In another aspect of the present invention the instrumentation apparatus is configured to instrument Java™ source code.

In another aspect of the present invention the instrumentation apparatus is configured to instrument Java™ bytecode.

In another aspect of the present invention the instructions referenced by the native handler carry out the task.

In another aspect of the present invention the instructions referenced by the native handler reference a class including instructions implemented in the first language that carry out the task.

In another aspect of the present invention the instrumentation apparatus is configured to instrument a system class if the task would change the system class loading order of a virtual machine were the task included in instrumentation of the system class.

In another aspect of the present invention a computer-implemented program is provided embodied on a computer-readable medium, the computer program including a code segment operative to instrument instructions of a computer-based software application, the instructions being in a first computer instruction language, with a native handler referencing instructions in a second language, and a code segment operative to create the instructions referenced by the native handler in the second computer instruction language to carry out at least one task during the execution of the computer-based software application.

In another aspect of the present invention the code segment operative to instrument is operative to instrument Java™ source code.

In another aspect of the present invention the code segment operative to instrument is operative to instrument Java™ bytecode.

In another aspect of the present invention the code segment operative to create is operative to create where the instructions referenced by the native handler carry out the task.

In another aspect of the present invention the code segment operative to create is operative to create where the instructions referenced by the native handler reference a class including instructions implemented in the first language that carry out the task.

In another aspect of the present invention the code segment operative to instrument is operative to instrument a system class, and the code segments are operative if the task would change the system class loading order of a virtual machine were the task included in instrumentation of the system class.

BRIEF DESCRIPTION OF THE DRAWINGS

The present invention will be understood and appreciated more fully from the following detailed description taken in conjunction with the appended drawings in which:

FIG. 1A is a simplified illustration of instrumented source code of a computer-based Java™ software application, useful in understanding the present invention;

FIGS. 1B-1F are simplified illustrations of instrumented source code of a computer-based Java™ software application and supporting source code, constructed and operative in accordance with an embodiment of the present invention;

DETAILED DESCRIPTION OF THE INVENTION

Figure 2:
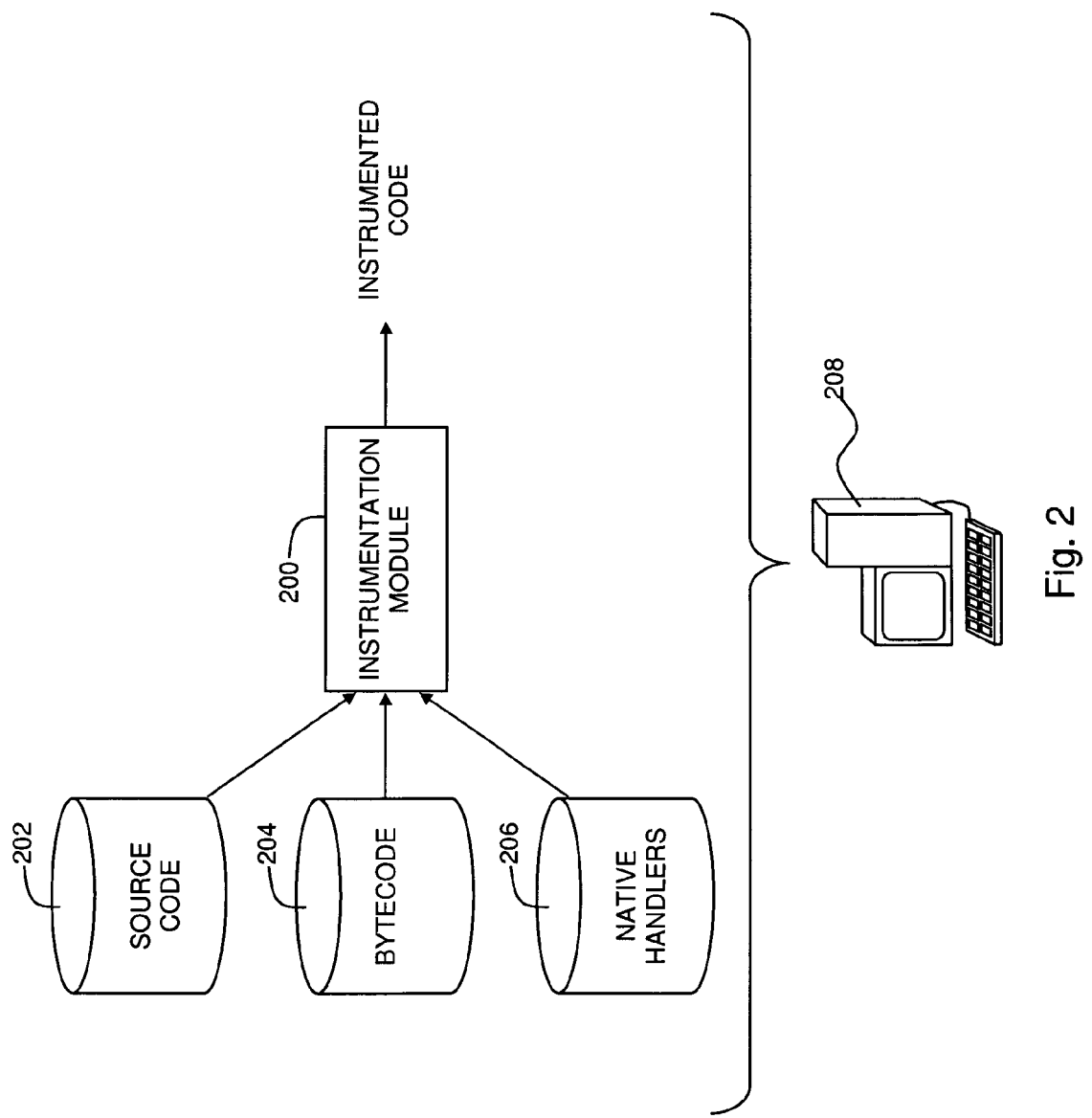
FIG. 2 is a simplified conceptual illustration of an instrumentation system, constructed and operative in accordance with an embodiment of the present invention.

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Reference is now made to FIG. 1A, which is a simplified illustration of instrumented source code of a computer-based Java™ software application, useful in understanding the present invention, and additionally to FIGS. 1B-1E, which are simplified illustrations of instrumented source code of a computer-based Java™ software application and supporting source code, constructed and operative in accordance with an embodiment of the present invention. Although the present invention is described with respect to Java™ source code for illustration purposes, the present invention is equally applicable to instrumentation of Java™ bytecode. In FIG. 1A, a snippet of Java™ code is shown in which a class "A", such as a Java™ system class, has a method "foo" into which instrumentation has been inserted including an inline reference to an instance "System.out" of a Java™ class java.io.PrintStream. The inserted instrumentation also references the Java™ classes java.lang.String, java.io.PrintStream, and java.lang.System. As was mentioned hereinabove, such instrumentation of Java™ application software may change the JVM class loading order and cause it to crash. This is remedied by the present invention as shown in FIG. 1B, in which the same Java™ code is instrumented with a reference to a native handler "NativeHandler.myNativeHandler," whose class is defined as shown in FIG. 1C. The native handler references a native method shown in FIG. 1D, which may itself carry out any tasks indicated by the original instrumentation, or may reference another native or non-native class, such as the Java™ class shown in FIG. 1E, which may then carry out any tasks indicated by the original instrumentation.

Thus, whereas execution flow in the original instrumented code of FIG. 1A is

A.foo->
System.out.println execution flow in the instrumented code of FIGS. 1B-1E is A.foo->
NativeHandlers.myNativeHandler->
JavaHandlers.myJavaHandler->
   System.out.println Thus, as the instructions to be instrumented reference a Java™ system class, rather than instrumenting the instructions with a Java™ handler that might change the system class loading order of the JVM into which the application is to be loaded, which in turn might cause the JVM to crash, the present invention may instead be used to instrument the instructions with a native handler that will not change the system class loading order. The native handler may then directly or ultimately cause the execution of the same task or tasks that, had they been part of instrumentation using a Java™ handler, would have changed the system class loading order.

The invention as shown in FIGS. 1B-1E may likewise be employed in place of the instrumentation shown in FIG. 1F, in which the instrumentation includes a reference to a Java™ handler which itself includes a reference to "System.out."

Although a specific type of instrumentation is shown in FIGS. 1B-1F for illustration purposes, the present invention contemplates the use of any type of instrumentation that may be inserted into the instructions of a computer-based software application, where the instructions of the computer-based software application are in a first computer instruction language, such as Java™ source code or bytecode, and where the inserted instrumentation includes one or more native handlers referencing instructions in a second computer instruction language, such as C++. The present invention is also applicable to computer-based software applications developed for use with the .NET™ virtual machine, also known as the Common Language Runtime (CLR), where the Java™ bytecode analog in .NET is called Intermediate Language (IL). In .NET™ applications instrumentation is performed as described hereinabove with reference to FIGS. 1B-1F, such as of .NET™ system classes.

Reference is now made to FIG. 2, which is a simplified conceptual illustration of an instrumentation system, constructed and operative in accordance with an embodiment of the present invention. In the system of FIG. 2, an instrumentation module 200 inserts instrumentation into computer-based software application source code 202 and/or bytecode 204, such as that of one or more system classes, in accordance with the method described hereinabove with reference to FIGS. 1B-1F. The instrumentation is in the form of calls to one or more native handlers 206 that call native methods as described hereinabove. Any of the elements shown in FIG. 2 are preferably executed by or otherwise made accessible to a computer 208, such as by implementing any of the elements shown in FIG. 2 in computer hardware and/or in computer software embodied in a computer-readable medium in accordance with conventional techniques.

Figure 3:
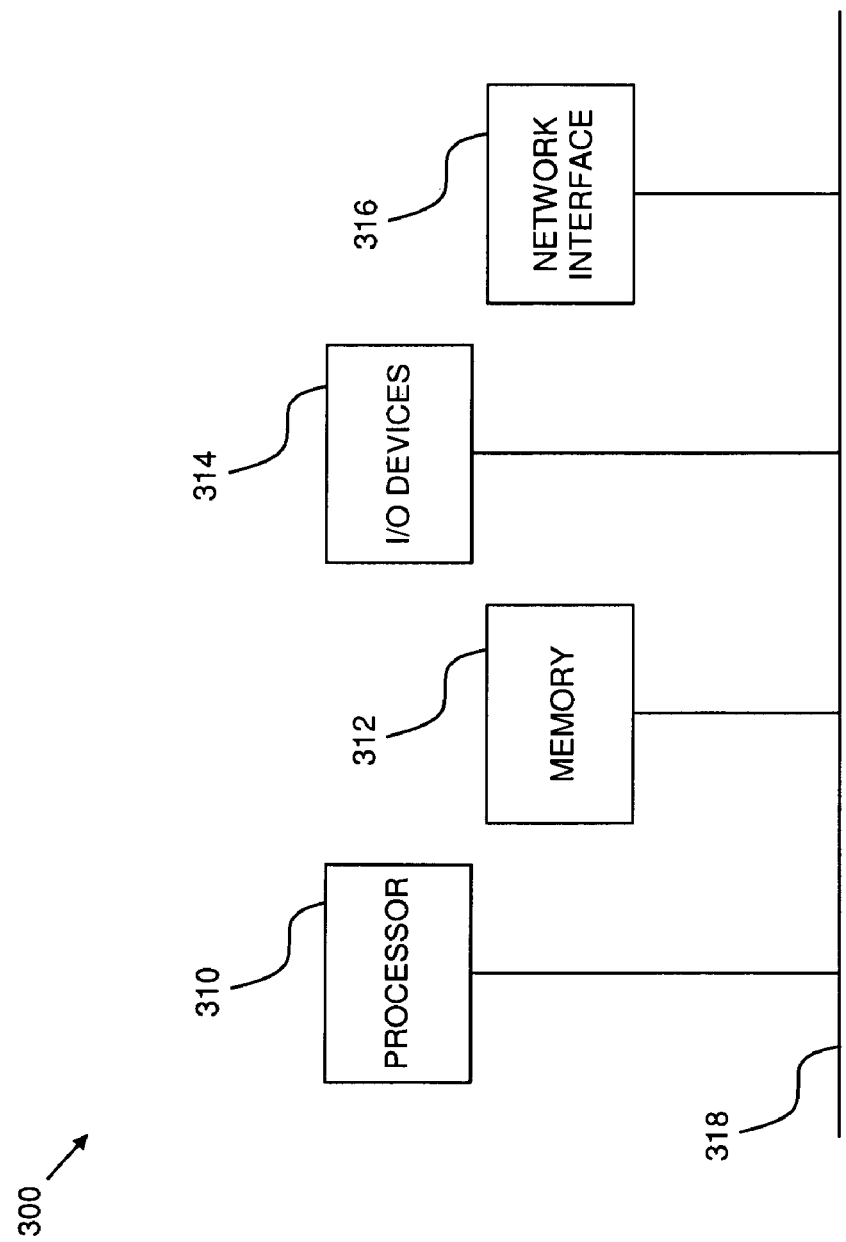
FIG. 3 is a simplified block diagram illustration of an exemplary hardware implementation of a computing system, constructed and operative in accordance with an embodiment of the present invention.

Referring now to FIG. 3, block diagram 300 illustrates an exemplary hardware implementation of a computing system in accordance with which one or more components/methodologies of the invention (e.g., components/methodologies described in the context of FIGS. 1B-2) may be implemented, according to an embodiment of the present invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for instrumenting a computer-based software application, the method comprising:
   instrumenting instructions of a computer software application, said instructions being in a first computer instruction language, with a native handler referencing instructions in a second language,
   wherein execution of said computer software application requires a loading of a first class before a loading of a second class, and
   wherein said instrumenting step is performed at a location within said computer software application where a reference to said second class in said first computer instruction language would cause said second class to be loaded before said first class during execution of said computer software application; and
   creating said instructions referenced by said native handler in said second computer instruction language to reference said second class in said first computer instruction language.

2. A method according to claim 1 wherein said instrumenting step comprises instrumenting Java™ source code.

3. A method according to claim 1 wherein said instrumenting step comprises instrumenting Java™ bytecode.

4. A method according to claim 1 wherein said instrumenting step comprises instrumenting a system class.

5. A system for instrumenting a computer-based software application, the system comprising:
   instrumentation apparatus configured to instrument instructions of a computer-based software application, said instructions being in a first computer instruction language, with a native handler referencing instructions in a second language,
   wherein execution of said computer software application requires a loading of a first class before a loading of a second class, and
   wherein said instrumentation apparatus is configured to instrument said computer software application at a location within said computer software application where a reference to said second class in said first computer instruction language would cause said second class to be loaded before said first class during execution of said computer software application; and
   at least one instruction referenced by said native handler in said second computer instruction language to reference said second class in said first computer instruction language,
   wherein any of said apparatus and instructions are implemented in any of
   a) computer hardware and
   b) computer software embodied in a non-transitory, computer-readable medium.

6. A system according to claim 5 wherein said instrumentation apparatus is configured to instrument Java™ source code.

7. A system according to claim 5 wherein said instrumentation apparatus is configured to instrument Java™ bytecode.

8. A system according to claim 5 wherein said instrumentation apparatus is configured to instrument a system class.

9. A computer-implemented program embodied on a non-transitory computer-readable medium, the computer-implemented program comprising:
   a code segment operative to instrument instructions of a computer-based software application, said instructions being in a first computer instruction language, with a native handler referencing instructions in a second language,
   wherein execution of said computer software application requires a loading of a first class before a loading of a second class, and
   wherein said code segment is operative to instrument said computer software application at a location within said computer software application where a reference to said second class in said first computer instruction language would cause said second class to be loaded before said first class during execution of said computer software application; and
   a code segment operative to create said instructions referenced by said native handler in said second computer instruction language to reference said second class in said first computer instruction language.

10. A computer program according to claim 9 wherein said code segment operative to instrument is operative to instrument Java™ source code.

11. A computer program according to claim 9 wherein said code segment operative to instrument is operative to instrument Java™ bytecode.

12. A computer program according to claim 9 wherein said code segment operative to instrument is operative to instrument a system class.

* * * * *